Oct. 13, 1953  F. J. MARKLE  2,655,643
SIGNAL FOR VEHICLES
Filed Oct. 17, 1952  2 Sheets-Sheet 1
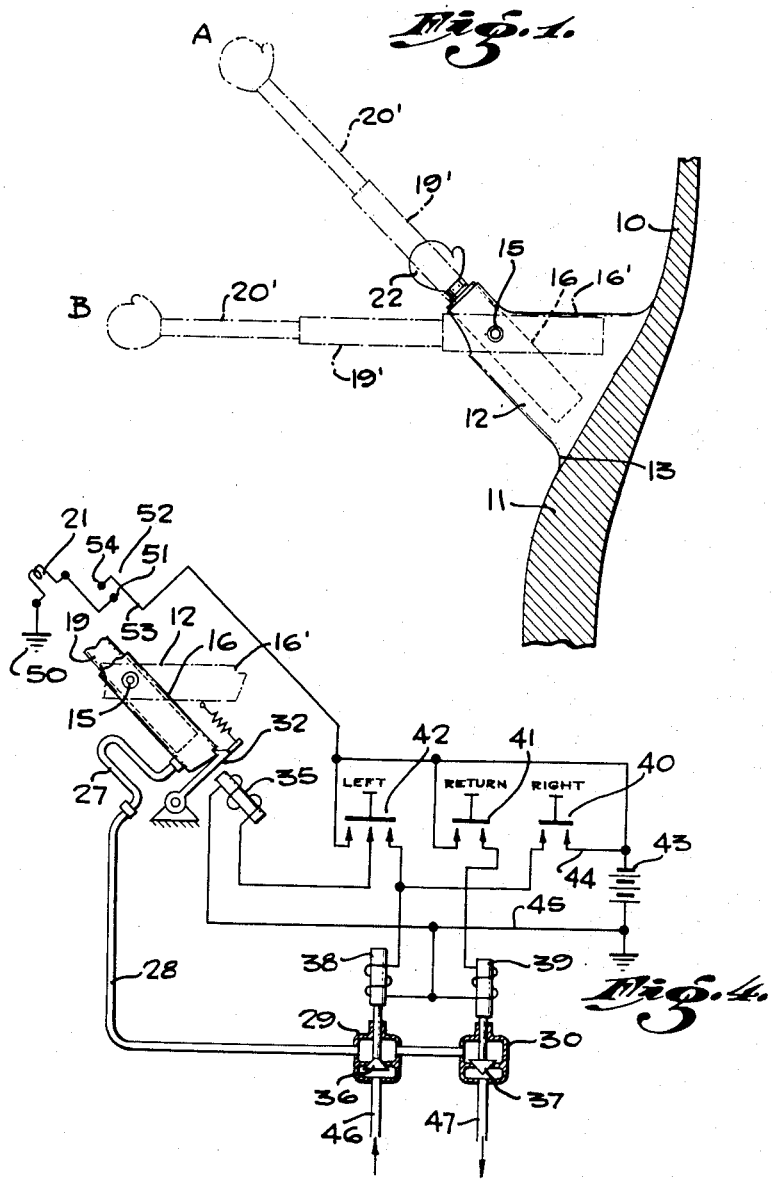
FREDRICK J. MARKLE,
INVENTOR.
BY Jesse P. Whann
ATTORNEY Oct. 13, 1953     F. J. MARKLE     2,655,643
SIGNAL FOR VEHICLES
Filed Oct. 17, 1952     2 Sheets-Sheet 2
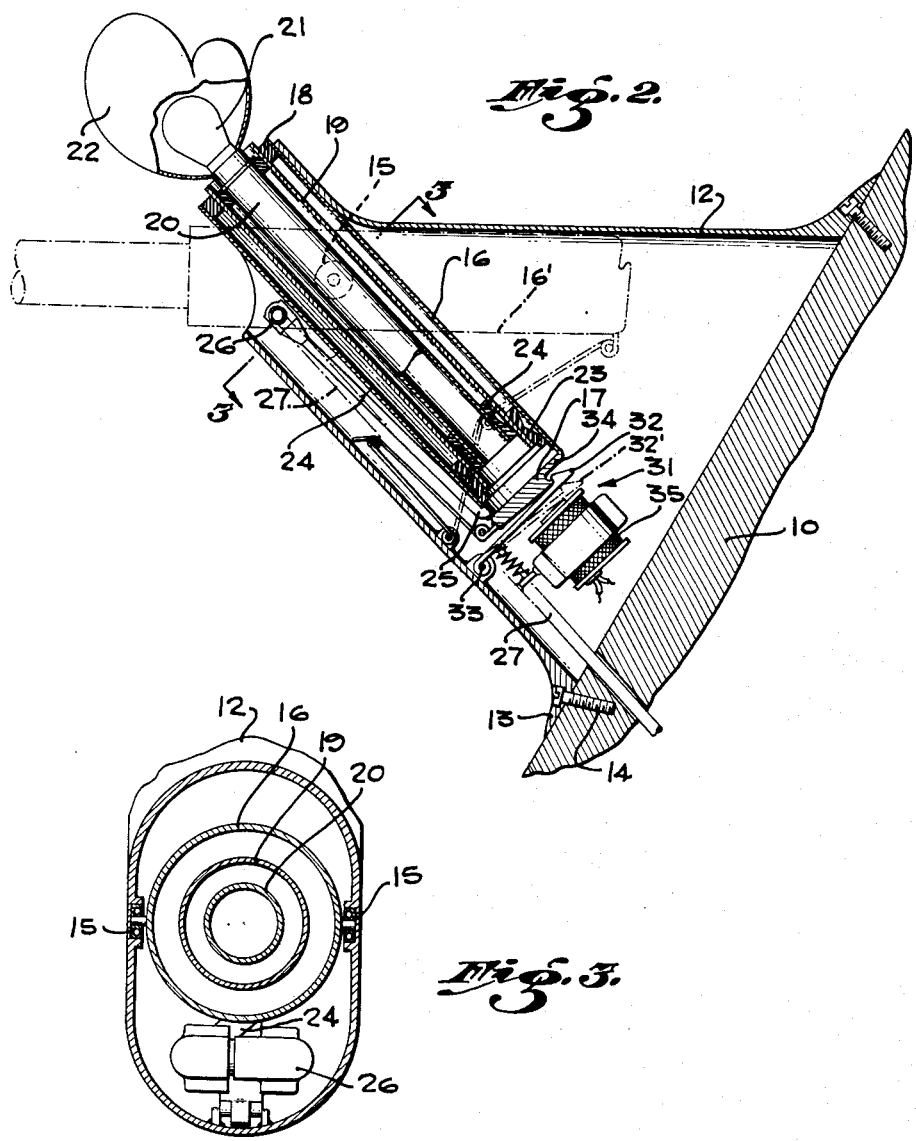
FREDRICK J. MARKLE,
INVENTOR.
BY *Jesse Mann*
ATTORNEY

UNITED STATES PATENT OFFICE 2,655,643

SIGNAL FOR VEHICLES

Frederick J. Markle, Tujunga, Calif.

Application October 17, 1952, Serial No. 315,360

6 Claims. (Cl. 340—136)

This invention relates in general to signalling devices, and relates in particular to a direction signal for vehicles.

It is an object of the invention to provide a directional signal which may be mounted upon the exterior of a vehicle, such as, for example, a sedan which may be closed off from the exterior, the signal, however, having control means of simple form operable within the vehicle without the necessity of extending a hand outside the vehicle or of opening a vehicle window in order to effect operation of the signal.

A further object of the invention is to provide an automobile directional signal arranged so that it may be controlled by the use of push buttons, thereby avoiding the necessity for the operator to move levers or pull out knobs, etc. In the operation of the present device, when the driver desires to display a signal he merely touches a control button, and when he desires to discontinue the display of such signal, he presses an adjacent button.

It is an object of the invention to provide an automobile directional signal which, when in retracted condition, occupies a small space, but when extended for the purpose of displaying a directional signal, projects an ample distance from the side of the vehicle to be seen by the drivers of following and approaching vehicles.

It is a further object of the invention to provide a directional signal which has signal arm parts adapted to be actuated by fluid pressure between extended and retracted positions. It is also an object of the invention to provide a signal arm having a lamp and means for illuminating the lamp when the arm is actuated into extended position. In the preferred practice of the invention, this lamp is contained in a translucent member shaped so as to resemble a hand.

It is an object of the invention to provide a directional signal having a signal arm comprising telescoping parts which are actuated into extended position by fluid pressure and which are returned to retracted position by suction.

A further object of the invention is to provide a control system for the signal having electromagnetic actuating parts which are selectively energized through the use of push button switches arranged to connect the electromagnetic means with a source of electrical energy.

Further objects and advantages of the invention may be brought out in the following part of the specification, wherein I have made a somewhat detailed disclosure of the invention for the purpose of enabling others to practice the same, without limiting the scope of the invention set forth in the appended claims.

Referring to the drawings which are for illustrative purposes only:

Fig. 1 is a diagrammatic elevational view showing the manner in which a form of the invention is mounted on the exterior of an automotive vehicle.

Fig. 2 is an enlarged fragmentary sectional view of the signal device, drawn to enlarged scale.

Fig. 3 is a cross section, to enlarged scale, taken as indicated by the line 3—3 of Fig. 2.

Fig. 4 is a wiring diagram showing the electrical components of the invention.

In Fig. 1, I have indicated the side wall 10 of a front portion of an automotive vehicle. For purposes of illustration, the outer surface 11 of the wall 10 is shown curved in accordance with the present day automobile body design, which provides a bulge at or just below the lower level of the side windows.

The direction signal device includes a housing 12 having a flange portion 13 arranged for engagement with the outer surface of the wall 10, as shown in Fig. 2. Screws 14 are disclosed as the means for securing the housing 12 to the wall 10.

Pivot members 15, carried by the outer portion of the housing 12, support a cylindrical member 16 so that it may swing from the full line position in which it is shown in Fig. 2 to the dotted line position 16'. The inner end of the cylinder 16 is closed by a head 17 and the outer end of the cylindrical member 16 has therein a collar 18 defining an opening which receives an intermediate cylinder 19 which is in telescoping relation to the cylindrical member 16 and in turn carries therein a tubular part 20 having a lamp 21 at its outer end. A hollow translucent member 22 is secured to the outer end of the tubular part 20 in a position to surround the lamp 21. This member 22 is made in the semblance of a hand. On the inner end of the intermediate cylinder 19 there is an annular sealing member 23, arranged to slide along the inner surface of the cylindrical member 16. On the inner end of the tubular part 20 there is an annular sealing member 24 which slides along the inner surface of the intermediate cylinder 19.

The invention provides means for applying fluid pressure to the inner end of the cylindrical member 16 so that this fluid pressure will act against the piston means which consist of the parts 19 and 20, to move the same outwardly to extended, signal-imparting position. The fluid pressure will likewise cause movement of the tubular part 20 outwardly with relation to the intermediate cylinder 19 so that the telescoping members 16, 19 and 20 will be positioned as indicated at 16', 19', and 20' in Fig. 1 in the manner of an extended arm. When suction is applied to the inner interior portion of the cylindrical member 16, atmospheric pressure will act to return the parts 19 and 20 to retracted positions within the cylindrical member 16.

For connecting the inner end of the cylinder 16 with a source of fluid pressure, such as compressed air or to a source of suction, not shown for the reason that any known means for producing pressure or suction may be used in conjunction with my invention, a tube 24 is extended from a point of communication 25 with the inner end of the cylindrical member 16 along the lower face of the cylindrical member 16 and to the position below the pivot means 15. The outer end of the tube 24 is connected by a swivel coupling 26 with a flexible tube 27 which is carried back into the interior of the automotive vehicle, and is connected by tubing 28 with electrically operated valves 29 and 30, as shown in Fig. 4.

When the members 19 and 20 are retracted within the cylindrical member 16, the center of gravity of the parts 16, 19 and 20 will lie to the right of the pivot means 15, causing the cylindrical member 16, and its contained parts, to swing in clockwise direction into the position in which it is shown in full lines in Fig. 2. When the intermediate cylinder 19 and the tubular part 20 are moved into extended positions as indicated at 19' and 20' in Fig. 1, the center of gravity of the assemblage will lie to the left of the pivot means 15, and the extended arm will tend to swing downward from the position A to the position B of Fig. 1. To control this movement of the extended arm from the position A to the position B, I provide electrically operated latch means 31 comprising a latch lever 32 supported by a pivot means 33 and being adapted to engage a shoulder 34 formed on the head 17 at the inner end of the cylindrical member 16. An electromagnet 35 is supported within the housing 12 adjacent the latch lever 32, so that electrical energization of the electromagnet 35 will result in magnetic attraction of the latch lever 32 into the phantom-line position 32' thereof. If at this time, the parts 19 and 20 are extended, the signal arm will rotate in counterclockwise direction from the position A to the position B, Fig. 1.

The valve devices 29 and 30 have closures 36 and 37 adapted to be opened by electromagnets 38 and 39. Push button switches 40, 41 and 42 are provided for connecting the respective electromagnets with a source of electrical energy shown as a battery 43. Conductor means 44 and 45 are arranged, upon closing of the switch 40, to connect the battery 43 in series with the electromagnet 38 so as to open the valve device 29 and connect the inner end of the cylindrical member 16 with a source of air pressure, not shown, which may be connected to the valve device 29 by tubing 46. This will result in the extension of the members 19 and 20 in the position A of Fig. 1, indicating a right hand turn. Should the operator then desire to retract the signal arm, he will close the switch 41, thereby connecting the electromagnet 39 in series with the battery 43, to open the valve device 30 and connect the inner end of the cylindrical member 16 with a source of suction, not shown, which may be connected to the valve device 30 through tubing 47. The application of suction to the inner end of the cylindrical member 16 will retract the members 19 and 20.

Should the operator of the vehicle desire to make a left turn, he will close the switch 42 which has three stationary contacts and a bridging contact so as to complete two separate circuits in series with the battery 43, one of these circuits extending through the winding of the electromagnet 35 and the other extending through the winding of the electromagnet 38, releasing the latch lever 32 and applying air pressure to the interior of the cylindrical member 16 to move the part 19 and the part 20 into extended position. As the parts 19 and 20 move outwardly, the center of gravity of the assemblage of the parts 16, 19 and 20 will shift leftwardly, and as soon as this center of gravity moves to the left of the pivot means 15, the signal arm will swing in counterclockwise direction and when the parts 19 and 20 are fully extended, the signal arm will occupy the position B of Fig. 1. Retraction of the signal arm is then accomplished by closing the switch 41. As the parts 19 and 20 move rightwardly from extended position, the center of gravity of the assembly will move rightwardly, and as soon as it passes to the right of the pivot means 15, the assembly of parts 16, 19 and 20 will rotate in clockwise direction into the position in which they are shown in full lines in Fig. 2, ready for the subsequent operation of the device.

As schematically shown in Fig. 4, I provide means for energizing the lamp 21 whenever the signal device is extended. One terminal of the lamp is connected to ground 50 and the remaining terminal is connected to one contact 51 of a switch 52 which is disposed within the telescoping members 16, 19 and 20. This switch 52 closes as the result of tension in the conductor means 53 whereby the second contact 54 of the switch 52 is connected to one side of the battery 43. The contact 51 is moved into engagement with the contact 54 when the lamp 21 is carried into its outermost position as the result of the extension of the members 19 and 20 from the cylindrical member 16 when pressure is applied to the inner end of the cylindrical member 16. The switch 52 is open when the members 19 and 20 are in retracted position so that no current is used from the battery 43 at this time.

I claim as my invention:

1. In a signal of the character described: an outer barrel; means for pivotally supporting said barrel on the signalling side of a vehicle so that it may swing between a substantially horizontal position and a sloping position; an inner piston means swingable in said barrel between extended and retracted position; valve means arranged to selectively alternately connect the interior of said barrel to a source of fluid pressure and a source of suction so that either pressure or suction may be applied to the inner end of said piston member to extend or retract the same; electromagnetic means for operating said valve means; and circuit means for connecting said electromagnetic means with a source of electrical current, said circuit means having selectively operable switch means therein for controlling the flow of current through said electromagnetic means to control the operation of said valve means.

2. In a signal of the character described: an outer barrel; means for pivotally supporting said barrel on the signalling side of a vehicle so that it may swing between a substantially horizontal position and a sloping position; an inner piston means swingable in said barrel between extended and retracted position, said means for pivotally supporting said barrel being arranged with relation to said barrel so that when said piston means is in retracted position, the outer portion of said barrel will be raised and so that when said piston means is moved into extended position, the outer end of said barrel will swing downwardly; valve means arranged to selectively alternately connect the interior of said barrel to a source of fluid pressure and a source of suction so that either pressure or suction may be applied to the inner end of said piston member to extend or retract the same; electromagnetic means for operating said valve means; circuit means for connecting said electromagnetic means with a source of electrical current, said circuit means having therein selectively operable switch means for controlling the flow of current through said electromagnetic means to control the operation of said valve means; and a selectively releasable latch arranged, unless released, to prevent swinging of said barrel from one position to the other thereof.

3. In a signal of the character described: an outer barrel; means for pivotally supporting said barrel on a signalling side of a vehicle so that it may swing between a substantially horizontal position and a sloping position; an inner piston means swingable in said barrel between extended and retracted position, said means for pivotally supporting said barrel being arranged with relation to said barrel so that when said piston means is in retracted position, the outer portion of said barrel will be raised and so that when said piston means is moved into extended position, the outer end of said barrel will swing downwardly; valve means arranged to selectively alternately connect the interior of said barrel to a source of fluid pressure and a source of suction so that either pressure or suction may be applied to the inner end of said piston member to extend or retract the same; electromagnetic for operating said valve means; circuit means for connecting said electromagnetic means with a source of electrical current, said circuit means having therein selectively operable switch means for controlling the flow of current through said electromagnetic means to control the operation of said valve means; a selectively releasable latch arranged, unless released, to prevent swinging of said barrel from one position to the other thereof; and electrically operated means for releasing said latch.

4. In a signal of the character described: an outer barrel; means for pivotally supporting said barrel on the signalling side of a vehicle so that it may swing between a substantially horizontal position and a sloping position; an inner piston means swingable in said barrel between extended and retracted position; first means comprising a valve arranged to connect the interior of said barrel to a source of fluid pressure so that said piston means will be moved outwardly in said barrel; second means comprising a valve arranged to connect the interior of said barrel with a source of suction to retract said piston member; means operative under selective control to effect swinging of said barrel from one to the other of said horizontal and sloping positions thereof; a first electromagnet for actuating said first means; a second electromagnet for actuating said second means; an electromagnet for actuating said last named means; switch means for connecting said first and third electromagnets simultaneously with a source of electrical current; switch means for connecting said first electromagnet independently with a source of electric current; and switch means for connecting said second electromagnet to a source of electrical current.

5. In a signal of the character described: an outer barrel; means for pivotally supporting said barrel on the signalling side of a vehicle so that it may swing between a substantially horizontal position and a sloping position; an inner piston means swingable in said barrel between extended and retracted position, said means for pivotally supporting said barrel being arranged with relation to said barrel so that when said piston means is in retracted position, the outer portion of said barrel will be raised and so that when said piston means is moved into extended position, the outer end of said barrel will swing downwardly; first means comprising a valve arranged to connect the interior of said barrel to a source of fluid pressure so that said piston means will be moved outwardly in said barrel; second means comprising a valve arranged to connect the interior of said barrel with a source of suction to retract said piston means; a selectively releasable latch arranged, unless released, to prevent swinging of said barrel from one position to the other thereof; a first electromagnet for actuating said first means; a second electromagnet for actuating said second means; an electromagnet for actuating said last named means; switch means for connecting said first and third electromagnets simultaneously with a source of electrical current; switch means for connecting said first electromagnet independently with a source of electrical current; and switch means for connecting said second electromagnet to a source of electrical current.

6. In a signal of the character described: an outer barrel; means for pivotally supporting said barrel on a side of a vehicle so that it may swing between a substantially horizontal position and a sloping position; an inner piston means swingable in said barrel between extended and retracted position, said piston means comprising at least two members in telescoping relation arranged to be extended and retracted by fluid pressure differential applied to the interior of said barrel, and said means for pivotally supporting said barrel being arranged with relation to said barrel so that when said piston means is in retracted position, the outer portion of said barrel will be raised and so that when said piston means is moved into extended position, the outer end of said barrel will swing downwardly; first means comprising a valve arranged to connect the interior of said barrel to a source of fluid pressure so that said piston means will be moved outwardly in said barrel; second means comprising a valve arranged to connect the interior of said barrel with a source of suction to retract said piston means; a selectively releasable latch arranged, unless released, to prevent swinging of said barrel from one position to the other thereof; a first electromagnet for actuating said first means; a second electromagnet for actuating said second means; an electromagnet for actuating said last named means; switch means for connecting said first and third electromagnets simultaneously with a source of electrical current; switch means for connecting said first electromagnet independently with a source of electrical current; and switch means for connecting said second electromagnet to a source of electrical current.

FREDERICK J. MARKLE.

References Cited in the file of this patent
UNITED STATES PATENTS

| Number | Name | Date |
|---|---|---|
| 1,687,183 | Smith et al. | Oct. 19, 1928 |
| 1,695,843 | Goff | Dec. 18, 1928 |
| 1,931,359 | Sako | Oct. 17, 1933 |
| 1,954,492 | Rosen | Apr. 10, 1934 |
| 2,099,331 | Crenshaw | Nov. 16, 1937 |